US006844533B1

(12) United States Patent
Chuang

(10) Patent No.: US 6,844,533 B1
(45) Date of Patent: Jan. 18, 2005

(54) INDUCTION HEATING APPARATUS

(75) Inventor: Yun-Ching Chuang, Taichung Hsien (TW)

(73) Assignee: KSP Technologies Corp., Taichung Hsien (TW)

( * ) Notice: Subject to any disclaimer, the term of this patent is extended or adjusted under 35 U.S.C. 154(b) by 0 days.

(21) Appl. No.: 10/652,637

(22) Filed: Aug. 29, 2003

(51) Int. Cl.[7] ............................ B23K 13/01; H05B 6/40

(52) U.S. Cl. ....................... 219/604; 219/672; 219/674; 219/675

(58) Field of Search ................................ 219/600–607, 219/633–635, 670, 672–677; 29/605

(56) References Cited

U.S. PATENT DOCUMENTS 4,048,458 A * 9/1977 Zirk, Sr. ..................... 219/673
4,340,038 A * 7/1982 McKean ..................... 219/635
4,371,768 A * 2/1983 Pozna ........................ 219/670
5,353,494 A * 10/1994 Bisbee et al. ................. 29/605
5,847,370 A * 12/1998 Sluka et al. ................ 219/604
6,084,225 A * 7/2000 Schmitt ...................... 219/672

* cited by examiner

*Primary Examiner*—Tu Hoang
(74) *Attorney, Agent, or Firm*—Jackson Walker LLP

(57) ABSTRACT

An induction heating apparatus seals a container, such as a bottle, with a non-tampering seal. The induction heating apparatus has a concentrator and a coil assembly. The coil assembly includes multiple coil devices. Each coil device includes a bobbin with a central tube and an insulated electrical conductor. The insulated electrical conductor is wound around the central tube of the bobbin and is electrically connected to an alternating current power source. The bobbin is mounted in the concentrator. When alternating current is applied to the insulated electrical conductor, an electromagnetic field is created that will induce in an aluminum foil in the non-tampering seal. The aluminum foil will be heated and the heat in the aluminum foil will be transferred to a layer of heat active polymer in the non-tampering seal, which will quickly bond the non-tampering seal to the bottle.

3 Claims, 4 Drawing Sheets

INDUCTION HEATING APPARATUS

BACKGROUND OF THE INVENTION

1. Field of the Invention

The present invention relates to an induction heating apparatus, and more particularly to an induction heating apparatus suitable for sealing various sizes of bottles.

2. Description of Related Art

Bottles are used to hold drinks, liquid or the like. In the market, various products for drinking are held in bottles. A bottle generally has a mouth, and a cap is attached to the mouth to seal the bottle to keep the liquid in the bottle from flowing out. A method of sealing bottles, called induction heating sealing, was developed over ten years ago. Induction heating sealing is a non-contact heating process that hermetically seals a bottle with a non-tampering seal. The non-tampering seal may include a layer of foam, wax, aluminum foil and heat active polymer that is compatible with the bottle material.

When an electromagnetic field is applied over the non-tampering seal that is mounted in the cap on the mouth of the bottle, the electromagnetic field induces in the aluminum foil and heats the aluminum foil. The heat in the aluminum foil will be transferred to the non-tampering seal and melt the heat active polymer that will quickly bond the non-tampering seal and the bottle.

However, the sizes of bottles today vary significantly. Conventional induction heating apparatus only can be used for a given size bottle. If the bottle size is increased, the conventional induction heating apparatus needs to be replaced with a suitable large one. However, to prepare various sizes of induction heating apparatus to accommodate each size of bottle in a factory will greatly increase cost for manufactures. Also, replacing conventional induction heating apparatus to accommodate a specific bottle size will require time for a technician.

To overcome the shortcomings, the present invention provides an induction heating apparatus suitable for various sizes of containers to mitigate or obviate the aforementioned problems.

SUMMARY OF THE INVENTION

The main objective of the invention is to provide an induction heating apparatus suitable for sealing various sizes of containers, such as bottles.

Other objectives, advantages and novel features of the invention will become more apparent from the following detailed description when taken in conjunction with the accompanying drawings.

DETAILED DESCRIPTION OF PREFERRED EMBODIMENT

Figure 1:
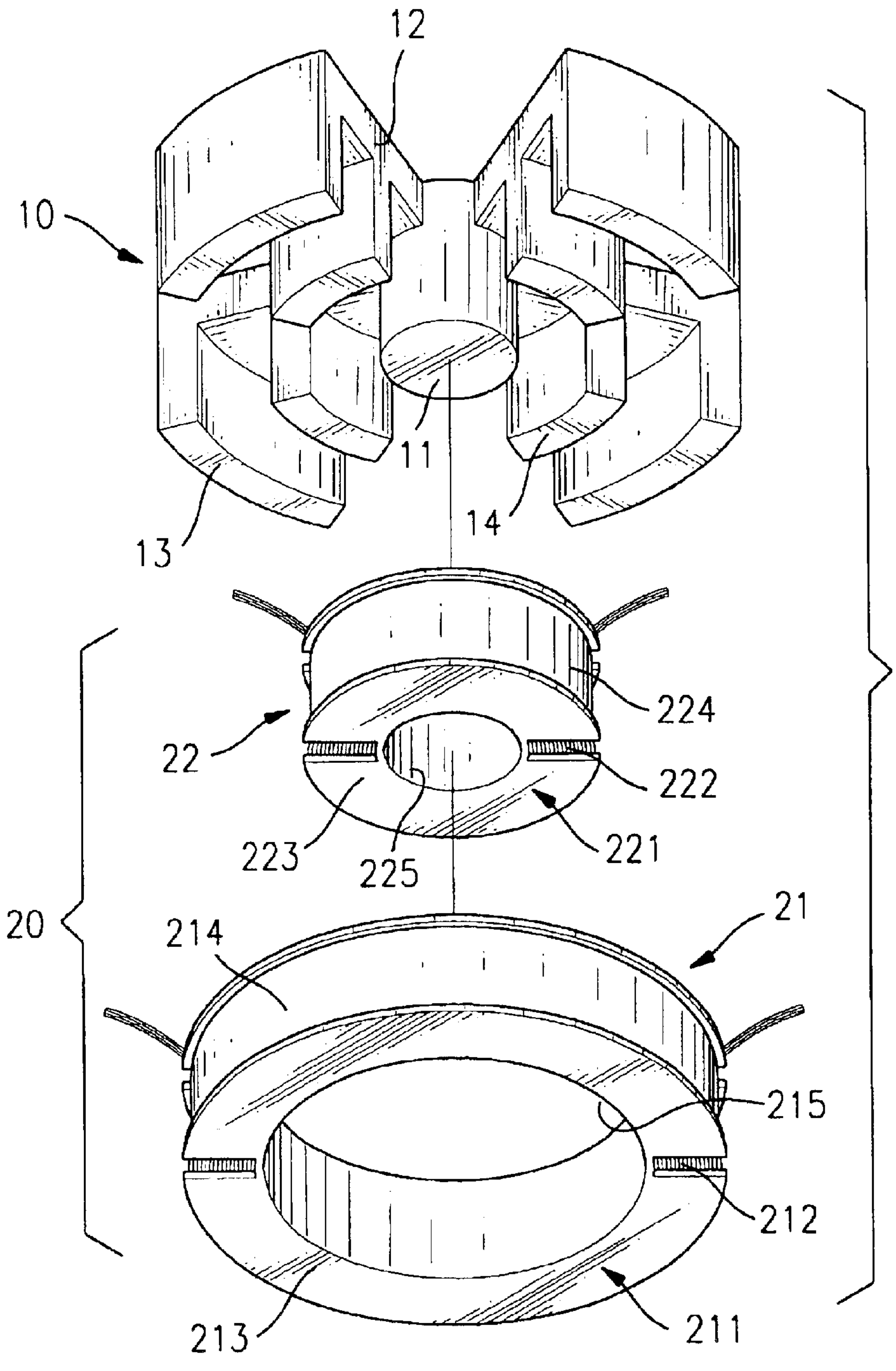
FIG. 1 is an exploded perspective view of an induction heating apparatus in accordance with the present invention.
Figure 2:
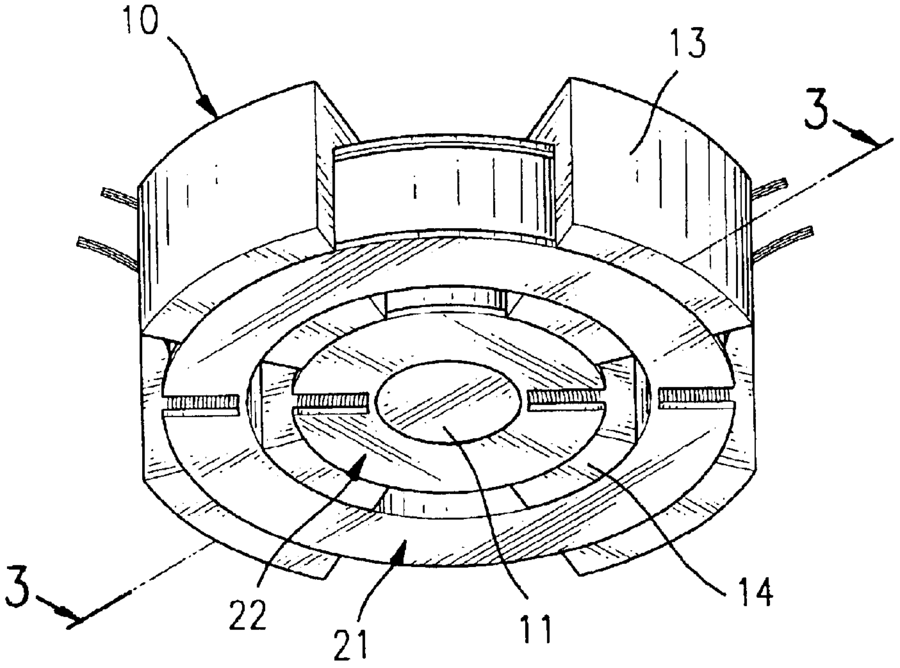
FIG. 2 is a perspective view of the induction heating apparatus in FIG. 1.

With reference to FIG. 1, an induction heating apparatus for sealing a container with a non-tampering seal comprises a concentrator (10) and a coil assembly (20). The concentrator (10) is made of paramagnetic materials and includes a central core (11), a base (not numbered), outside walls (13) and inside walls (14). The base has a center (not shown) and four sector bases (12) arranged around the center. The central core (11) is formed on and extends from the center of the base. Each sector base (12) has an outside edge (not numbered) around the center and is displaced from each adjacent sector base (12) by an angular displacement of 45°. The outside walls (13) are integrally formed respectively from the sector bases (12) at the outside edges. The outside walls (13) are perpendicular to the sector bases (12) and encircle the central core (11). The inside walls (14) are respectively and integrally formed from the sector bases (12) between the central core (11) and the outside walls (13).

The coil assembly (20) is mounted in the concentrator (10) between the central core (11) and the outside walls (13) and comprises a large coil device (21) and a small coil device (22). With adaptation of the concentrator (10), more than two coil devices could be used. Both the large and small coil devices (21, 22) have a similar structure, and each comprises a bobbin (211, 221), an insulated electrical conductor (212, 222) and an insulator (214, 224). Each bobbin (211, 221) comprises a central tube (215, 225) and two flanges (213, 223). Each central tube (215, 225) has two ends, and a flange (213, 223) is respectively formed around each end of each central tube (215, 225). The insulated electrical conductors (211, 222) are wound respectively around the central tubes (215, 225) between the flanges (213, 223). The insulators (214, 224), such as insulating tape, are wound respectively around the insulated electrical conductors (212, 222) to protect the insulated electrical conductors (212, 222). The large coil device (21) is mounted in the concentrator (10) between the inside walls (14) and the outside walls (13). The small coil device (22) is mounted in the concentrator (10) between the central core (11) and the inside walls (14).

Figure 3:
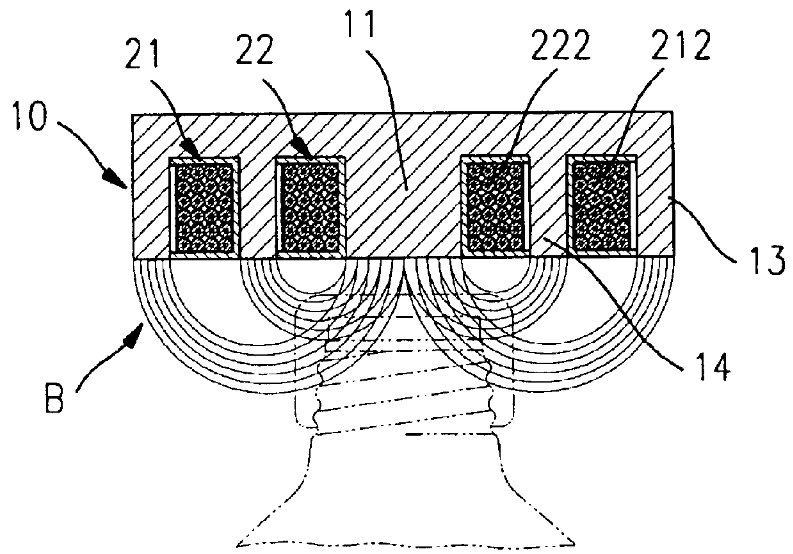
FIG. 3 is an operational cross sectional side plan view of the induction heating apparatus along line 3—3 in FIG. 2 when the induction heating apparatus is used for a small size bottle.

With reference to FIG. 3, the induction heating apparatus can be used to seal a small bottle (not numbered) with a small non-tampering seal (not shown). The small non-tampering seal includes layers of foam, wax, aluminum foil and heat active polymer and is mounted in a cap (not numbered) that is screwed onto the small bottle. The insulated electrical conductors (212, 222) are respectively and electrically connected to a power source (not shown) that supplies alternating current into the insulated electrical conductors (212, 222). The alternating current in each insulated electrical conductor (212, 222) has the same frequency and phase. When the alternating current is applied to the insulated electrical conductors (212, 222), a time-varying electromagnetic field (B) is created by the alternating current in both the large and the small coil devices (21, 22). The flux of the electromagnetic field (B) will induce in the aluminum foil (not shown) of the small non-tampering seal to heat the aluminum foil. The heat in the aluminum foil will be transferred to the heat active polymer and melt the heat active polymer that will quickly bond the small non-tampering seal and the small bottle.

Figure 4:
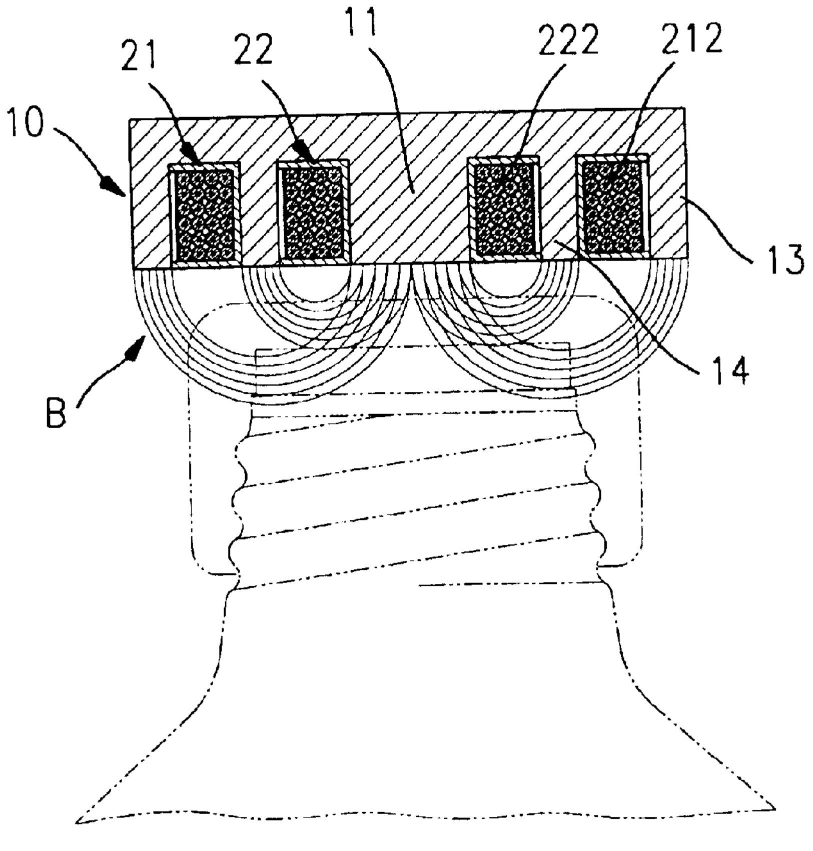
FIG. 4 is an operational cross sectional side plan view of the induction heating apparatus in FIG. 1 when the induction heating apparatus is used for a large size bottle.

With reference to FIG. 4, the induction heating apparatus can be used to seal a large bottle (not numbered) with a large non-tampering seal (not shown). Because the electromagnetic field (B) created by the large coil device (21) will induce in the large non-tampering seal, the induction heating apparatus induces in the aluminum foil of the large non-tampering seal to seal the large bottle.

The induction heating apparatus has a capability to hermetically seal larger sizes of bottles by adding additional outside walls (13) and inside walls (14) and coil assemblies and the sector bases (12). Manufactures would not need to replace the induction heating apparatus to accommodate any specific sizes of containers. The invention would save quite a lot of time and money for the manufacturers that seal numerous containers of different sizes.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An induction heating apparatus for sealing various sizes of containers, and the induction heating apparatus comprising:

a concentrator having
  a base with a center;
  a central core extending from the base at the center;
  multiple outside walls integrally extending from the base and arranged around the central core; and
  multiple inside walls are formed from the base between the central core and the outside walls; and
a coil assembly attached to the concentrator between the central core and the outside walls, and the coil assembly comprising
  multiple coil devices attached to the concentrator between the central core and the outside walls, and each coil device having
    a bobbin having a central tube with two ends, and a flange formed at each end of the central tube; and
    an insulated electrical conductor wound around the central tube of the bobbin between the flanges;
wherein the multiple inside walls are formed between two of the adjacent coil devices.

2. The induction heating apparatus as claimed in claim 1, wherein the base has four sector bases that are separated from each other with an angular displacement of 45°.

3. The induction heating apparatus as claimed in claim 2, wherein an insulation tape is wound around each insulated electrical conductor of each coil device.

* * * * *